United States Patent
Gandhi

(10) Patent No.: US 10,194,480 B2
(45) Date of Patent: Jan. 29, 2019

(54) CORE SIGNALLING REDUCTION IN DUAL CONNECTIVITY

(71) Applicant: CISCO TECHNOLOGY, INC., San Jose, CA (US)

(72) Inventor: Indermeet Singh Gandhi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 15/065,686

(22) Filed: Mar. 9, 2016

(65) Prior Publication Data

US 2017/0265175 A1    Sep. 14, 2017

(51) Int. Cl.
*H04W 76/20*    (2018.01)
*H04W 76/15*    (2018.01)
*H04W 76/11*    (2018.01)
*H04L 5/00*    (2006.01)
*H04W 28/08*    (2009.01)

(52) U.S. Cl.
CPC .............. *H04W 76/20* (2018.02); *H04L 5/001* (2013.01); *H04W 28/08* (2013.01); *H04W 76/11* (2018.02); *H04W 76/15* (2018.02)

(58) Field of Classification Search
None
See application file for complete search history.

(56) References Cited

U.S. PATENT DOCUMENTS

| | | | | |
|---|---|---|---|---|
| 2015/0181473 A1* | 6/2015 | Horn | ................. | H04W 36/0027 370/331 |
| 2015/0327094 A1* | 11/2015 | Lee | ........................ | H04W 76/27 370/252 |
| 2015/0358866 A1* | 12/2015 | Xu | ......................... | H04W 36/00 370/331 |
| 2016/0157155 A1* | 6/2016 | Chiba | ................. | H04W 76/041 455/436 |

(Continued)

OTHER PUBLICATIONS

Ericsson, "Ericsson First With Key 5G Advances" Press Release, Feb. 25, 2015, 4 pages.

*Primary Examiner* — Hassan A Phillips
*Assistant Examiner* — Gautam Sharma
(74) *Attorney, Agent, or Firm* — Patterson + Sheridan, LLP

(57) ABSTRACT

An example method performed at a first network device configured to operate as a small cell gateway anchoring both control and user plane for a Master Radio Access Point (MRAP) and a Secondary Radio Access Point (SRAP) is provided. The method includes receiving, from the MRAP, a first message comprising an indication that a first bearer is to be switched from the MRAP to the SRAP, the first message comprising a Tunnel Endpoint Identifier TEID of a general packet radio service (GPRS) tunneling communications protocol (GTP) tunnel of a long-term evolution (LTE) network associated with the first bearer in that the TEID identifies a GTP tunnel for the first bearer, and a first transport layer address (e.g. IP address) of the SRAP to which downlink data for the TEID associated with the first (Continued)

bearer is to be sent to reach user devices that utilize the first bearer. The method also includes, upon receiving downlink data for the first bearer, sending the received downlink data to the first transport layer address using the TEID provided in the first message.

20 Claims, 6 Drawing Sheets

(56) References Cited

U.S. PATENT DOCUMENTS

| | | | |
|---|---|---|---|
| 2016/0174285 A1* | 6/2016 | Ke .......................... | H04W 8/06 |
| | | | 370/329 |
| 2016/0278097 A1* | 9/2016 | Ueda ..................... | H04W 28/08 |
| 2016/0309379 A1* | 10/2016 | Pelletier ............... | H04W 76/27 |

* cited by examiner

CORE SIGNALLING REDUCTION IN DUAL CONNECTIVITY

TECHNICAL FIELD

This disclosure relates in general to the field of communications and, more particularly, to systems and methods for reducing core signaling in dual connectivity settings.

BACKGROUND

The Universal Mobile Telecommunications System (UMTS) is a third generation mobile cellular system for networks based on the GSM standard. UMTS specifies a complete network system including the radio access network (UMTS Terrestrial Radio Access Network (UTRAN). A fourth generation Evolved Packet System (EPS) architecture specified by 3rd Generation Partnership Project (3GPP) standard, also sometimes referred to as a "Long Term Evolution (LTE) EPS architecture" (or simply as "LTE" or "4G"), now has a Release 12 that provides a way for User Equipment (UE) to be connected to two Evolved UTRAN (E-UTRAN) NodeBs (eNBs) at the same time using "Dual Connectivity" (DC). An eNB is a radio access point, implemented largely in hardware, connected to the mobile phone network that communicates directly with mobile handsets (also referred to as "user equipment" or "UEs"), like a base transceiver station (BTS) in Global System for Mobile Communications (GSM) networks. In LTE DC, there is a Master eNB (MeNB) that maintains the Radio Resource Control (RRC) connection with the UE and there is a Secondary eNB (SeNB) without RRC. The user data traffic can flow via both the Master and the Secondary, thus justifying the name "dual connectivity." Dual Connectivity advantageously allows dynamically distributing traffic between the Master and the Secondary radio access points, e.g. offloading traffic from the Master to the Secondary based on load-balancing considerations.

As described in 3GPP TS 36.300 Release 12, in LTE DC, the radio protocol architecture that a particular bearer uses depends on how the bearer is setup. Three bearer types exist: Master Cell Group (MCG) bearer, Secondary Cell Group (SCG) bearer and split bearer. The SCG bearer setup provides various advantages, such as e.g., ability to relax requirements for having an ideal X2 backhaul link, no buffering requirement on MeNB for packets transmitted by the SeNB, no flow control needed between MeNB and SeNB, local break-out and content caching at SeNB straightforward for dual connectivity UEs, etc. However, it also suffers from certain drawbacks. For example, one drawback is that offloading of traffic from MeNB to SeNB must be performed by a Mobile Management Entity (MME), which is an entity within a core network (CN) of a telecommunications system, and cannot be very dynamic. Another is that all switches between MeNB and SeNB involve signaling in the CN, taking up valuable limited bandwidth in CN communications. Improvements with respect to one or more of these drawbacks of the SCG would be desirable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
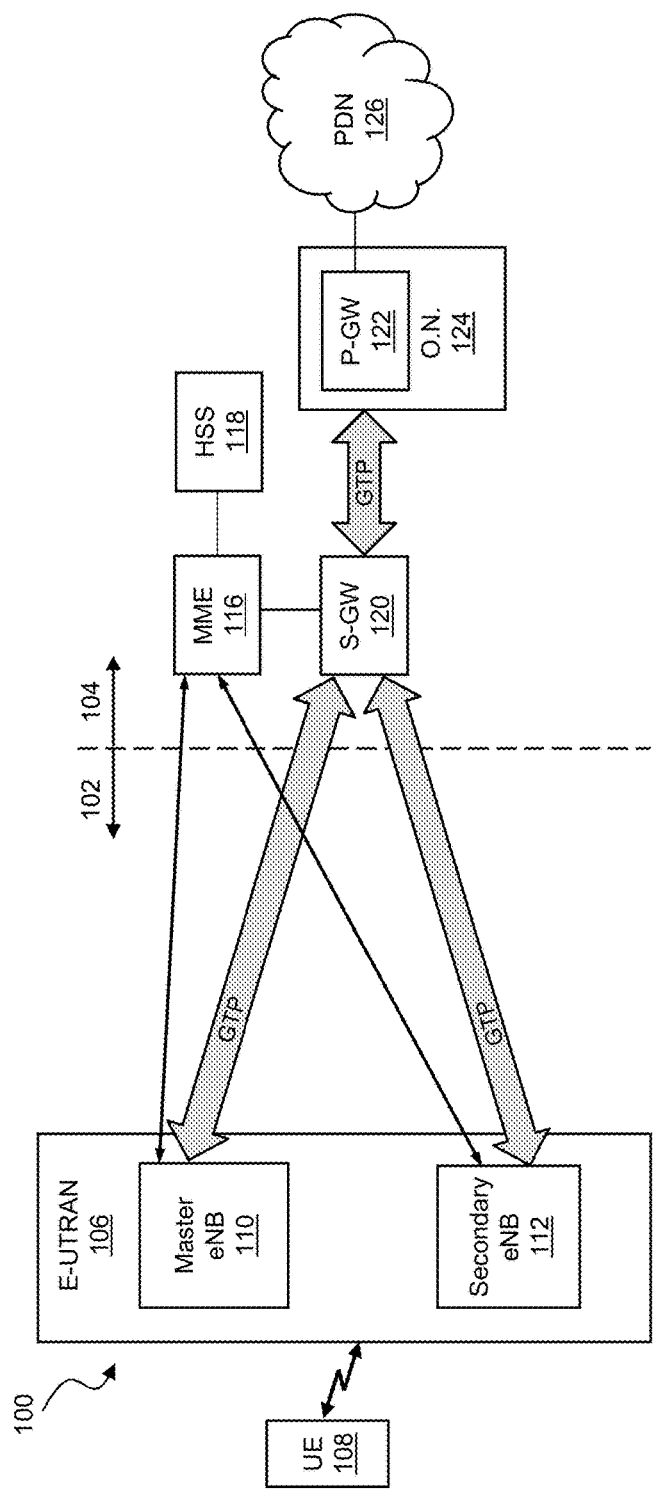
FIG. 1 is a simplified block diagram illustrating an exemplary communication system in a network environment.

One aspect of the present disclosure provides a computer-implemented method for providing core signaling reduction (CSR) in a network environment that supports dual connectivity and small cell architecture. In general, core signaling refers to signaling messages exchanged within or/and with a core network of a wireless mobile telecommunications network. In general, small cell architecture refers to deploying at least some of radio access points, e.g. eNBs, as small cell radio access point, such as e.g. Home eNode B (HeNB), configured to operate in a licensed spectrum to connect user equipment to the network. In context of dual connectivity, implementation of a small cell architecture means that each of the Master eNB and the Secondary eNB can be a small cell radio access point, e.g. Master HeNB and Secondary HeNB, respectively. For a mobile operator, small cell radio access points can offer improvements to both coverage and capacity, which is particularly applicable to indoor networking environments where macro cell networks typically suffer coverage limitations. Each of the small cell radio access points are typically communicatively connected to a small cell radio access point gateway (HeNB-GW) anchoring both control and user planes. A HeNB-GW enables all HeNBs parented to it to be represented as a single eNB to the remainder of the LTE EPS.

The method for providing core signaling reduction in a network environment that supports dual connectivity and small cell architecture could be implemented by a functional entity referred to herein as a "CSR logic." Various parts of the method could be implemented by one or more of a HeNB-gateway (HeNB-GW), a Master Radio Access Point (MRAP), and/or a Secondary Radio Access Point (SRAP), where each of the Master and the Secondary RAPs can be an eNB, a HeNB, or a Wireless Radio Access Point providing other wireless network services such as e.g. Wi-Fi®. Therefore, in various embodiments, the CSR logic, or part thereof, could be implemented within any of these network elements or/and distributed among a plurality of network elements.

In one embodiment, the CSR method is performed at a first network device configured to operate as a small cell gateway anchoring both control and user plane for a MRAP and a SRAP, e.g. a HeNB-GW, and includes receiving, from the MRAP, a first message comprising an indication that a first bearer is to be switched from the MRAP to the SRAP, the first message comprising a Tunnel Endpoint Identifier TEID of a general packet radio service (GPRS) tunneling communications protocol (GTP) tunnel of an LTE network associated with the first bearer in that the TEID identifies a GTP tunnel for the first bearer, and a first transport layer address (e.g. IP address) of the SRAP to which downlink data for the TEID associated with the first bearer is to be sent to reach user devices that utilize the first bearer. The method also includes, upon receiving downlink data for the first bearer, sending the received downlink data to the first transport layer address using the TEID provided in the first message.

As used herein, a small cell gateway anchoring both control and user plane for the Master and the Secondary radio access points refers to a gateway acting as a concentrator for the C-Plane, i.e., S1-MME interface towards the MME and terminating the S1U interface from the HeNB in the Uplink direction and from the S-GW in the Downlink direction. In contrast, S-GW only anchors the user plane.

As will be appreciated by one of ordinary skill in the art, aspects of the present disclosure, in particular the functionality related to core signaling reduction described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing HeNB-GWs, eNBs, HeNBs and/or other wireless radio access points, and various control nodes) or be stored upon manufacturing of these devices and systems.

Example Embodiments

Exemplary Setting for Providing Small Cell Gateway Redundancy

For purposes of illustrating the techniques for providing core signaling reduction in a network environment, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

An exemplary network in which embodiments of the present disclosure can be implemented is illustrated in FIG. 1, providing a simplified block diagram illustrating a network environment comprising a communication system 100, according to one embodiment of the present disclosure. An exemplary configuration shown in FIG. 1 may be tied to the 3rd Generation Partnership Project (3GPP) Evolved Packet System (EPS) architecture, also sometimes referred to as the Long Term Evolution (LTE) EPS architecture. However, while FIG. 1 illustrates elements of and the present disclosure is described with reference to LTE, embodiments of the present disclosure and the depicted architecture are equally applicable, with modifications as would be apparent to a person of ordinary skill in the art to other telecommunications environments. Thus, in some instances, the communication system 100 may include LTE access networks such as evolved UTRAN (E-UTRAN), generally referred to as 4G or LTE. In other instances, the communication system 100 may include other access networks such as GSM EDGE radio access network (GERAN), UMTS terrestrial radio access network (UTRAN), generally referred to as 3G, which can be provided using one or more NodeB/Radio Network Controllers (NodeB/RNCs), Home Node B's (HNBs), HNB gateways, Mobile Switching Centers (MSCs), serving General Packet Radio Service (GPRS) support nodes (SGSNs), and gateway GPRS support nodes (GGSNs). In yet other instances, the communication system 100 may include non-3GPP networks, such as e.g. WiMAX.

The communications system 100 may be viewed as comprising a radio access network (RAN) part 102 and a core network (CN) part 104, each part containing various network elements or nodes as described in greater detail below.

In LTE, the radio access network 102 includes an Evolved UMTS Terrestrial Radio Access Network (E-UTRAN) 106 (sometimes the terms "LTE" and "E-UTRAN" are used interchangeably) used to provide wireless access for user devices shown in FIG. 1 as User Equipment (UE) 108. In various embodiments, UEs such as the UE 108 can be associated with users, employees, clients, customers, etc. wishing to initiate a flow in the communication system 100 via some network. The terms 'user equipment,' 'mobile node,' 'end user,' 'user,' and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within the communication system 100. UE 108 may also be inclusive of a suitable interface to a human user such as a microphone, a display, a keyboard, or other terminal equipment.

As used herein, the terms 'user equipment,' 'mobile node,' 'end user,' 'user,' and 'subscriber' may be used interchangeably.

UE 108 may also be any device that seeks to initiate a communication on behalf of another entity or element such as a program, a database, or any other component, device, element, or object capable of initiating an exchange within the communication system 100. The term "data" as used herein refers to any type of numeric, voice, video, media, or script data, or any type of source or object code, or any other suitable information in any appropriate format that may be communicated from one point to another. In certain embodiments, UE 108 may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses for the access sessions can be assigned using dynamic host configuration protocol (DHCP), Stateless Address Auto-configuration, default bearer activation, etc., or any suitable variation thereof.

In order to provide wireless access for UEs 108, E-UTRAN 106 includes one or more evolved Node B (eNB) transceivers which act as radio access points for the UE 108.

An eNB is an LTE network radio network component configured to act as a radio access point for the UEs 108 by connecting to the E-UTRAN 106 and being responsible for radio transmission and reception from UEs 108 in one or more cells. Typically, the radio access network 102 includes a plurality of eNB transceivers. Since embodiments of the present disclosure deal with dual connectivity, i.e. connectivity of a single user device to two different eNBs, FIG. 1 depicts two eNBs within the E-UTRAN 106—Master eNB 110 and Secondary eNB 112.

Furthermore, typically, the radio access network 102 includes further transceivers, not shown in FIG. 1, such as e.g. a 1×RTT transceiver, a high-rate packet data (HRPD) transceiver, and an evolved high-rate packet data (eHRPD) transceiver, each of which can connect to the radio access network 102. Other radio access technologies such as WiFi, Femto, WiMAX, or any other radio spectrum technology can use a further transceiver, not shown in FIG. 1, to connect to the network using a broadband or other access network.

For a 3GPP EPS architecture (i.e. in LTE), the core network 104 is sometimes referred to as an Evolved Packet Core (EPC) and typically includes one or more mobility management entities (MMEs) 116, one or more home subscriber servers (HSSs) 118, one or more serving gateways (S-GWs) 120, and one or more packet data network (PDN) gateways (P-GWs) 122. In some embodiments, one or more of EPC components can be implemented on the same gateway or chassis. The EPC elements may be provided in the service provider network to provide various UE services and/or functions, to implement Quality of Service (QoS) on packet flows and to provide connectivity for UEs to external packet data networks (PDNs) such as e.g. Internet, an exemplary PDN shown in FIG. 1 as a PDN 126.

The MME 116 resides in the EPC control plane and manages node selection, session states, authentication, paging, mobility with 3GPP 2G/3G nodes, roaming, and other bearer management functions. The MME can be a stand-alone element or integrated with other EPC elements, including the S-GW, P-GW, and Release 8 Serving GPRS Support Node (SGSN) (not shown in FIG. 1). The MME can also be integrated with 2G/3G elements, such as the SGSN and GGSN. This integration is the key to mobility and session management interworking between 2G/3G and 4G mobile networks.

The MME 116 is a control-node for the LTE radio access network 102. The MME 116 may be responsible for UE tracking and paging procedures including retransmissions. The MME 116 may handle the bearer activation/deactivation process and may also be responsible for node selection of an S-GW and P-GW for a UE at the initial attach and at time of an intra-LTE handover. The MME 116 may also authenticate the user by interacting with the HSS 118. In various embodiments, the MME 116 may also generate and allocate temporary identities to UEs, terminate Non-Access Stratum (NAS) signaling, check the authorization of the UE to camp on the service provider's Public Land Mobile Network (PLMN), and enforce UE roaming restrictions. The MME 116 may also be the termination point in the network for ciphering/integrity protection for NAS signaling and may be configured to handle the security key management. Lawful interception of signaling may also be supported by the MME. Still further, the MME 116 may also provide the control plane function for mobility between LTE and 2G/3G access networks with the S3 interface terminating at the MME from the SGSN (not shown). The MME 116 also terminates the S6a interface towards the home HSS for roaming UEs.

The HSS 118 may store subscription-related information (subscriber profiles), perform authentication and authorization of the user, provide information about the subscriber's location and IP information, and respond to subscription requests from the MME 116. The HSS 118 can provide subscription data using Update-Location Answer (ULA) responses by accessing its user database and providing the user information to the MME 116. The HSS is sometimes referred to as an authentication, authorization, and accounting (AAA) server because it can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. Further, the HSS 118 can be a master user database that supports IP multimedia subsystem (IMS) network entities that handle calls.

The S-GW 120 is a data plane element, also referred to as a "user plane element," that can manage user mobility and interfaces with RANs. Being in the user plane, the S-GW maintains data paths between eNBs of the E-UTRAN 106, such as e.g. the Master eNB 110 and the Secondary eNB 112 described above, and the P-GW 122 by forwarding and routing packets to and from the eNBs and the P-GW, as shown in FIG. 1 with the GTP tunnels between these elements, described in greater detail below. The S-GW also serves as the local mobility anchor for inter-eNB handover and mobility between 3GPP networks. The S-GW is configured to route and forward user data packets, while also acting as the mobility anchor for the user plane during inter-eNB handovers and as the anchor for mobility between LTE and other 3GPP technologies, terminating S4 interface and relaying the traffic between 2G/3G systems and the P-GW. For idle state UEs, the S-GW terminates the down link data path and triggers paging when down link data arrives for the UE. The S-GW can manage and store UE contexts, e.g. parameters of the IP bearer service and network internal routing information, as well as perform replication of the user traffic in case of lawful interception.

In some embodiments, the S-GW 120 may be implemented within an access gateway, not shown in FIG. 1 individually, that could implement a combination of additional functionalities such as a packet data serving node (PDSN) and/or a HRPD serving gateway (HS-GW). Such an access gateway can communicate with an anchor gateway, not shown individually, which can implement a P-GW, a Home Agent (HA), and an MME. On the radio access network side 102, such an anchor gateway can also communicate with an evolved packet data gateway (ePDG) which may provide connectivity to the HeNB/WiFi/Femto/other radio access points. On the packet core side 104, such an anchor gateway can communicate with the operator's IP service domain (not shown), an IP multimedia subsystem (IMS) (not shown), and the PDN 126. The AAA/HSS 118 may then communicate with such an access gateway, an anchor gateway, or both.

The P-GW 122 provides connectivity for UEs to external packet data networks, shown in FIG. 1 as the PDN 126, which could e.g. be Internet, SIP-based IMS networks (fixed and mobile), or other similar networks. Thus, the P-GW 122 acts as the interface between the LTE network and other, external, packet data networks. The P-GW serves as the anchor point for intra-3GPP network mobility, as well as mobility between 3GPP and non-3GPP networks. In some embodiments, the P-GW 122 may act as the Policy and Charging Enforcement Function (PCEF), which manages Quality of Service (QoS), online/offline flow-based charging data generation, deep-packet inspection, and lawful intercept. The P-GW 122 provides connectivity to the UE 108 to external packet data networks by being the point of exit and entry of traffic for the UE. A UE may have simultaneous connectivity with more than one P-GW for accessing multiple packet data networks, such multiple P-GWs and multiple PDNs not shown in FIG. 1. The P-GW 122 may be configured to perform policy enforcement, packet filtering for each user, charging support, lawful interception, and packet screening. The P-GW can also provide an anchor for mobility between 3GPP and non-3GPP technologies such as WiMAX and 3GPP2 standards (CDMA 1× and EVDO).

Typically in mobility environments, when a UE 108 connects to the network 100, an IP address may be assigned to each default bearer for the UE, which IP address is later used to carry data for the UE. In particular, in LTE deployment of access sessions, i.e. sessions where a subscriber wants to use a service and exchange data with an external PDN, call control signaling is used to assign one of the IP addresses, of a pool of IP addresses of a customer (typically a network operator), to a subscriber (i.e. to a particular UE 108), which IP address is eventually used to carry data between the UE 108 of the subscriber and the PDN 126. Typically, the P-GW 122 is in charge of assigning IP addresses for the subscriber access sessions.

Mobile packets carrying data for the UEs 108 are exchanged between the S-GW 120 and the P-GW 122. Typically, a network element such as e.g. a router (not shown in FIG. 1) is implemented between the S-GW 120 and the P-GW 122 in order to route the packets between the S-GW 120 and the P-GW 122. Such a router and the P-GW 122 may be considered to belong to operator's network (O.N.), shown as O.N. 124 in FIG. 1.

In context of telecommunications networks, the term "bearer" generally refers to a communication path between two nodes of a telecommunications network that supports exchange of data traffic. There are many ways to specify bearers. A communication path between a UE and a P-GW is typically referred to as an "EPS bearer" and includes all of the components from the RAN 102 to the CN 104. The EPS bearer may be viewed as being comprised of two parts. One part of the EPS bearer is a bearer between a UE, such as e.g. the UE 108, and an S-GW, such as e.g. the S-GW 120, such bearer referred to in LTE as an "Evolved Radio Access Bearer (E-RAB)." Such bearer is also sometimes referred to as a "radio bearer" because it enables communication over the radio access network part of a telecommunications network (i.e. over the RAN 102). The term "radio bearer" is also sometimes used to describe a part of E-RAB, namely a bearer between a UE and an eNB serving the UE, while the other part of E-RAB, i.e. a bearer between the eNB serving the UE and the S-GW is referred to as "S1 bearer." Another part of the EPS bearer is a bearer between a UE, such as e.g. the UE 108, and an S-GW, such as e.g. the S-GW 120, such bearer referred to in LTE as an "S5/S8 bearer" or simply "S5/S8." This bearer is also sometimes referred to as a "core network bearer" because it enables communication over the core network part of a telecommunications network (i.e. over the CN 104). The EPS bearers can be of two types—one type is default bearer, and another type is dedicated bearer. In general, a default bearer does not have specific QoS and only standard/nominal QoS is applied, while dedicated bearer has a specific, typically guaranteed QoS. A default bearer is established during Attach Process, while dedicated bearer is typically established during a call setup following an idle period (although it may also be established during the Attach Process as well). There are different default and dedicated bearers to support different subscriber sessions. For example, one bearer may support Voice-over-IP sessions, another bearer may support text messages, a third bearer may support video exchange, etc. An E-RAB bearer is identified by its E-RAB ID, which allows differentiation between different E-RABs.

Exchange of mobile packets carrying data for the UEs 108 is done via a tunnel established between each two peer nodes of the telecommunications network 100 according to a GPRS Tunneling Protocol (GTP). Such a tunnel is commonly referred to as a "GTP tunnel." GTP-C (where "C" stands for "Control") is a part of the GTP that is used within the core network 104 for signaling, i.e. exchange of control information, while GTP-U (where "U" stands for "User") is a part of the GTP that is used for carrying user data within the core network 104 and between the RAN 102 and the core network 104. In GTP, each subscriber session, using a particular bearer, is uniquely identified by a tunnel endpoint identifier (TEID) carried in the header of a packet exchanged between the peer nodes. The TEID identifies a set of endpoints (i.e. GTP tunnel termination points) for a GTP tunnel for a particular bearer for exchanging user data for a particular subscriber session (i.e. of a particular UE 108), i.e. it identifies a tunnel endpoint at each of the two peer nodes between which the GTP tunnel is provided for exchanging user data of a particular subscriber session. FIG. 1 illustrates exemplary GTP tunnels that could exist in the communication system 100. As shown in FIG. 1, there could be a GTP tunnel between the P-GW 122 (or the O.N. 124) and the S-GW 120, a GTP tunnel between the S-GW 120 and the Master eNB 110, and a GTP tunnel between the S-GW 120 and the Secondary eNB 112, as illustrated in FIG. 1 with pipe-like (i.e. thick) two-way arrows labeled as "GTP" between each pair of these peer nodes. On the other hand, thin two-way arrows shown in FIG. 1 between the MME 116 and the Master eNB 110, and between the MME 116 and the Secondary eNB 112 represent exchange of control/signaling information between these network elements. Since the GTP tunnel is provided on a per-bearer basis, the GTP tunnels shown in FIG. 1 are for a particular bearer. Furthermore, a particular bearer would typically have only one of the tunnels shown in FIG. 1 between the S-GW 120 and E-UTRAN 106—either to the Master eNB 110 or to the Secondary eNB 112. Similar separate tunnels could be present for other bearers. For example, for a first bearer served by the Master eNB 110, a first GTP tunnel would be between the P-GW 122 (or the O.N. 124) and the S-GW 120, with the TEID of the first tunnel identifying the P-GW 122 (or the O.N. 124) and the S-GW 120 as the tunnel endpoints, and a second GTP tunnel would be between the S-GW 120 and the Master eNB 110, with the TEID of the second GTP tunnel identifying the S-GW 120 and the Master eNB 110 as the tunnel endpoints. On the other hand, for a second bearer served by the Secondary eNB 112, the first GTP tunnel would be as for the first bearer, but separate from that of the first bearer, while the second GTP tunnel would be between the S-GW 120 and the Secondary eNB 112, with the TEID of the second tunnel identifying the S-GW 120 and the Secondary eNB 112 as the tunnel endpoints.

A GTP tunnel is a 'tunnel' because data for UEs is encapsulated into data packets that traversing a GTP tunnel, the packets being such that, between a given pair of peer nodes, all data packets traversing the GTP tunnel in a particular direction have the same source and destination IP addresses, irrespective of the different IP addresses assigned to the UEs. For example, mobile data packets travelling via the GTP tunnel from the S-GW 120 to the P-GW 122 are characterized by having the IP address of the S-GW 120 as their "source IP address" and by having the IP address of the P-GW 122 as their "destination IP address." Similarly, mobile data packets travelling via the GTP tunnel from the P-GW 122 to the S-GW 120 are characterized by having the IP address of the P-GW 122 as their "source IP address" and by having the IP address of the S-GW 120 as their "destination IP address." GTP tunnels allow the flow of bearer data.

A single UE/subscriber can have multiple bearers at the same time—e.g. a user of a mobile phone may use one bearer for making a call using Voice-over-IP while using another bearer for receiving text messages. Therefore, a single subscriber can have multiple TEID (one TEID per each bearer of the subscriber). A particular TEID identifies a GTP-u tunnel for a particular bearer (i.e. there is one TEID per bearer), which can be used to exchange user data, between the network elements of the communications network 100, for many different subscribers.

A single radio access point such as e.g. each one of the eNBs 110, 112 has different interfaces for different bearers, with an IP address being assigned to each interface used for exchanging data over a particular bearer. Therefore, a single radio access point may have multiple IP addresses, one IP address for each bearer used.

Dual Connectivity and Conventional E-RAB Modification Procedure

As previously described herein, Dual Connectivity involves two eNBs in providing radio resources to a given UE (with active radio bearers). Although there are two active radio bearers, a single S1-MME termination point exists for an UE between a MME and the E-UTRAN. The E-UTRAN architecture and related functions to support Dual Connectivity for E-UTRAN is further described in 3GPP TS 36.300. In particular, dual connectivity described in TS 36.300 defines a "Secondary Cell Group (SCG) bearer" alternative. For E-RABs configured as "SCG bearers" it enables changing the U-plane termination point in the E-UTRAN by means of S1 MME signaling without changing the S1-MME termination point.

Figure 2:
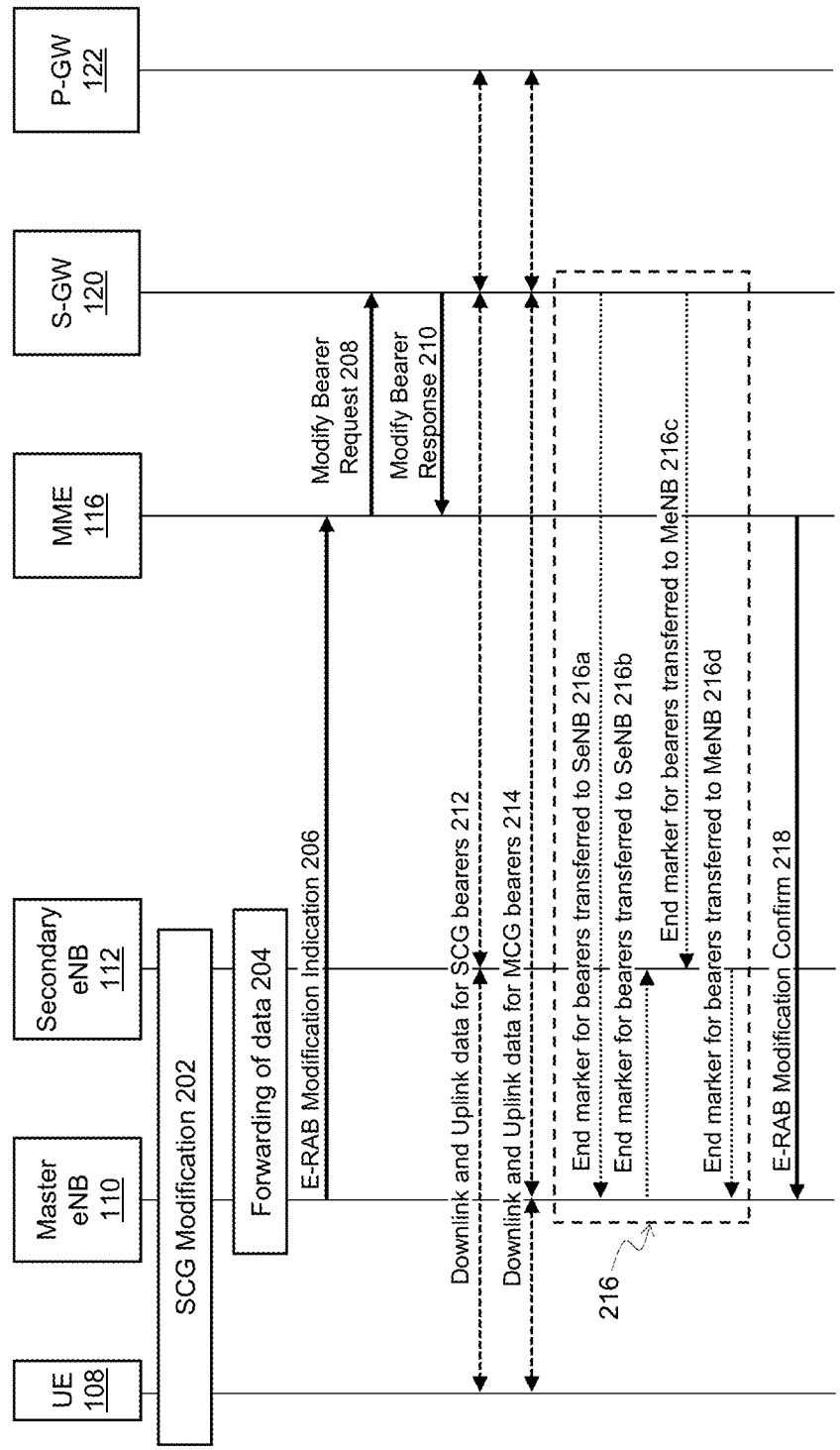
FIG. 2 illustrates conventional E-UTRAN initiated E-RAB modification procedure.

When SCG bearer option is applied to support dual connectivity operation, E-UTRAN initiated E-RAB modification procedure as described in 3GPP TS 23.401 is used to transfer bearer contexts to and from Secondary eNB. This description is provided below, with reference to FIG. 2 illustrating conventional E-UTRAN initiated E-RAB modification procedure as described in 3GPP TS 23.401. Further details regarding E-RAB modification are described in 3GPP TS 36.413, in particular in section 8.2 describing E-RAB Management procedures and in section 9.1.3 describing E-RAB Management Messages.

FIG. 2 illustrates communications between the UE 108, the Master eNB 110, the Secondary eNB 112, the MME 116, the S-GW 120, and the P-GW 122 illustrated in FIG. 1.

The E-RAB modification procedure is typically preceded by, or may be considered to begin with, a step shown in FIG. 2 as SCG modification 202, during which the UE 108, the Master eNB 110, and the Secondary eNB 112 add, modify, or release UE resources at the Secondary eNB 112.

After that, a step shown in FIG. 2 as Forwarding of data 204 takes place between the Master eNB 110 and the Secondary eNB 112. In this step, user data forwarding may be performed for E-RABs configured with the SCG bearer in order to prevent service disruption. The behavior of the eNB from which data is forwarded is the same as specified for the "source eNB" for handover, the behavior of the eNB to which data is forwarded is the same as specified for the "target eNB" for handover.

In step 206 the Master eNB 110 sends an E-RAB Modification Indication message to the MME 116. Content and structure of an E-RAB Modification Indication message is described in 3GPP TS 36.413, in particular in section 9.1.3.8. In particular, the E-RAB Modification Indication message of step 206 includes the IP addresses of the eNBs between which EPS bearers could be switched and TEIDs for downlink (DL) user plane for all the EPS bearers. The E-RAB Modification Indication message of step 206 also indicates, for each bearer, whether it is modified or not.

In step 208 the MME 116 sends a Modify Bearer Request message per PDN connection to the S-GW 120, only for the affected PDN connections (i.e. for the PDN connections where EPS bearer is being switched/modified). The message includes IP addresses of the eNB address(es) and TEIDs for downlink user plane for all the EPS bearers and indicating whether Idle mode Signaling Reduction (ISR) is activated. If ISR was activated before this procedure, the MME 116 maintains ISR. The UE 108 is informed about the ISR status in the Tracking Area Update procedure. If the S-GW 120 supports Modify Access Bearers Request procedure and if there is no need for the S-GW 120 to send the signaling to the P-GW 122, the MME 116 may send a Modify Access Bearers Request (eNB address(es) and TEIDs for downlink user plane for all the EPS bearers, ISR Activated) to the S-GW 120 to optimize the signaling.

In step 210, the S-GW 120 returns to the MME 116 a Modify Bearer Response message or a Modify Access Bearers Response that includes an IP address of the S-GW 120 and TEID of the S-GW 120 for uplink (UL) traffic. The Modify Bearer Response message of step 210 is a response to the Modify Bearer Request message of step 208, while the Modify Access Bearers Response message of step 210 is a response to the Modify Access Bearers Request message of step 208.

After step 210, the S-GW 120 can start sending downlink packets to the correct eNBs using the newly received IP addresses of the eNBs and the TEID. In FIG. 2, dashed double-arrows 212 between the UE 108, the Secondary eNB 112, and S-GW 120, and the P-GW 122 indicate downlink and uplink exchanges of data between the respective elements connected by the arrows, in case of SCG bearers. Similar to the arrows 212, dashed double-arrows 214 shown in FIG. 2 indicate downlink and uplink exchanges of data between the respective elements connected by the arrows, but for the case of MCG bearers.

In step 216, in order to assist the reordering function in the Master eNB 110 and/or the Secondary eNB 112, for the bearers that are switched between the Master eNB 110 and the Secondary eNB 112, the S-GW 120 sends one or more "end marker" packets on the old path immediately after switching the path as defined in TS 36.300, section 10.1.2.2. To this end, step 216 includes step 216a during which the S-GW 120 sends to the Master eNB 110 an end marker packet indicating bearers that were transferred from the Master eNB 110 to the Secondary eNB 112, step 216b during which the Master eNB 110 forwards the indication of step 216a to the Secondary eNB 112, step 216c during which the S-GW 120 sends to the Secondary eNB 112 an end marker packet indicating bearers that were transferred from the Secondary eNB 112 to the Master eNB 110, and step 216d during which the Secondary eNB 112 forwards the indication of step 216c to the Master eNB 110.

In step 218, the MME 116 confirms the E-RAB modification with the E-RAB Modification Confirm message provided to the Master eNB 110. In this message, the MME 116 indicates for each bearer whether it was successfully modified, kept unmodified or already released by the EPC as defined in TS 36.413. For the EPS bearers that have not been switched successfully in the core network, it is the MME's decision whether to maintain or release the corresponding EPS bearers.

As the foregoing illustrates, conventional E-RAB modification includes substantial amount of signaling of the core network nodes, in particular—the MME. Since bandwidth in the core network is scarce, it is always desirable to reduce signaling in the core network.

Improved E-RAB Modification Procedure

Embodiments of the present disclosure are based on recognition that E-RAB modification procedure in case of SCG bearer option can be improved in deployments where small cell radio access points are used by installing functionality related to E-RAB modification on a small cell gateway that anchors both control and user plane for a Master and a Secondary radio access points in the E-UTRAN, e.g. a HeNB-GW. In particular, the small cell gateway may be configured to carry out E-RAB modification avoiding signaling related to this process between the MME and the small cell gateway and eliminating signaling related to this process between the MME and the S-GW, thus advantageously reducing signaling in the core network. In addition, since a small cell gateway is a network element in the radio access part of a telecommunications network, configuring it to control E-RAB modification allows to hide switches between Master and Secondary radio access points from the core network, which may be advantageous in case the EPC nodes, e.g. MME and S-GW, do not support Dual Connectivity UEs, i.e. they are not compliant with 3GPP Release 12 specification.

Figure 3:
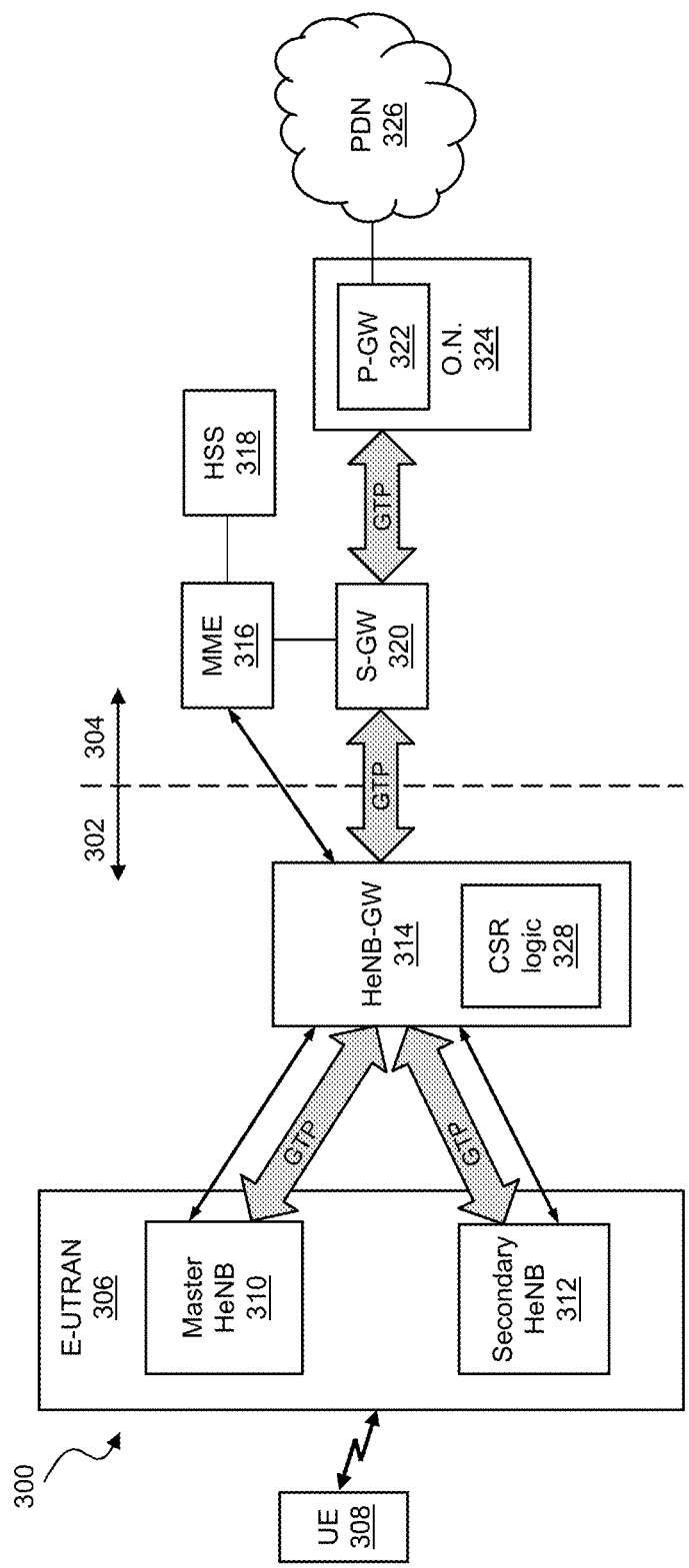
FIG. 3 is a simplified block diagram illustrating an exemplary communication system in a network environment that allows core signaling reduction in dual connectivity, according to some embodiments of the present disclosure.

FIG. 3 is a simplified block diagram illustrating an exemplary communication system 300 in a network environment configured to provide core signaling reduction, according to some embodiments of the present disclosure. The communication system 300 includes all of the elements shown in FIGS. 1 and 2, which descriptions are applicable here unless specified otherwise. Therefore, in the interest of brevity, the descriptions similar to those provided for FIGS. 1 and 2 are not repeated, and only the differences with respect to FIGS. 1 and 2 are highlighted.

Unlike in the illustration of FIG. 1, in FIG. 3 each of the Master and the Secondary radio access point can be a small cell radio access point, such as Home eNode B (HeNB), referred to interchangeably as a 'HeNB access point', 'HeNB', 'small cell radio access point', 'small cell access point', 'small cell', 'femtocell' or 'femto'. This is illustrated in FIG. 3 with the Master radio access point being shown as a Master HeNB 310 and with the Secondary radio access point being shown as a Secondary HeNB 312. An HeNB is typically configured to perform the same function of an eNB, but is optimized for deployment for smaller coverage than a typical, macro, eNB, such as e.g. indoor premises and public hotspots.

In many network architectures, HeNBs can be deployed as autonomous units to improve reception in areas with poor coverage, or within buildings where coverage is reduced by the structure itself. Essentially, HeNBs are fully featured base stations that can provide proximate coverage in a business (e.g., enterprise) and/or residential environment. Typically, HeNBs operate at lower radio power levels as compared to macro RANs including eNodeBs, etc. HeNBs can be connected using a standard broadband digital subscriber line (DSL), internet, service network and/or cable service into a service provider's core network. Calls can be made and received, where the signals are sent (potentially encrypted) from the HeNB via the broadband IP network to one of the service provider's main switching centers. HeNBs can be provisioned to readily handle 8, 16, 32, etc. concurrent calls. Thus, HeNBs generally operates as a mini tower for a proximate user.

In order to scale deployments of HeNBs, the LTE architecture beneficially includes a small cell gateway (HeNB-GW) element, shown in FIG. 3 as an HeNB-GW 314. Each of the HeNBs 310 and 312 is connected to the HeNB-GW 314, and is said to be "parented" to that gateway. The HeNB-GW 314 enables all HeNBs parented to it to be represented as a single eNB to the remainder of the communication system 300, in particular to the elements of the core network 304 and beyond. In effect, the HeNB-GW presents an aggregate of all of the HeNBs connected to the gateway to the EPC (e.g., the MME).

In some embodiments, the HeNB-GW 314 may include CSR logic 328, as illustrated in FIG. 3, where the CSR logic 328 is configured to carry out parts of the improved E-RAB modification methods described herein. However, even though the CSR logic 328 is illustrated in FIG. 3 as included within the HeNB-GW 314, in other embodiments, the logic 328 may be implemented separately from HeNB-GW 314 as long as it is communicatively connected to the HeNB-GW 314 to configure the HeNB-GW 314 to carry out the improved E-RAB modification as described herein.

It should be understood that, in various embodiments, any number of eNBs, HeNBs, GWs, PDNs, and other elements shown in FIG. 3 in a singular form may be deployed in a network environment as the one illustrated in FIG. 3. Further, each of the elements of FIG. 3 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, the communication system 300 may include a configuration capable of transmission control protocol/Internet protocol (TCP/IP) communications for the transmission or reception of packets in a network. Communication system 300 may also operate in conjunction with a user datagram protocol/IP (UDP/IP) or any other suitable protocol where appropriate and based on particular needs.

In addition, while FIG. 3 illustrates and the following description refers to dual connectivity in terms of two HeNBs—Master HeNB 310 and Secondary HeNB 312, HeNBs 310 and 312 represent, in general, any radio access points that can offer suitable connectivity to one or more UEs 308 using any appropriate protocol or technique, as long as one of them is specified as a Master and the other one is specified as a Secondary radio access point of dual connectivity and are connected to a small cell radio access gateway. Thus, in general terms, each of the HeNBs 310 and 312 represents a radio access point device that can allow UEs to connect to a wired network using Wi-Fi, Bluetooth™, WiMAX, 4G/LTE, or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (LAN), an HeNB, an HNB, or any other suitable access device, which may be capable of providing suitable connectivity to a given UE 308. In certain cases, the radio access point can connect to a router, e.g. via a wired network (not shown in FIG. 3), which can relay data between different UEs of the network.

In one example implementation, the logic 328, the HeNB-GW 314, Master HeNB 310, Secondary HeNB 312, S-GW 320, P-GW 322, MME 316 and other elements shown in FIG. 3 are network elements, which are meant to encompass network appliances, servers, routers, switches, gateways, bridges, load balancers, firewalls, processors, modules, or any other suitable device, component, element, or object operable to exchange information that facilitates or otherwise helps to provide core signaling reduction in dual connectivity described herein. In other embodiments, these operations and/or features may be provided external to these elements, or included in some other network device/element or a plurality of elements to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

One further difference of FIG. 3 with respect to FIG. 1 resides in GTP tunnels and exchange of control information. When small cell radio access point gateway is present, such as the HeNB-GW 314, there is a GTP tunnel between the P-GW 322 (or the O.N. 124) and the S-GW 320, a GTP tunnel between the S-GW 320 and the HeNB-GW 314, a GTP tunnel between the HeNB-GW 314 and the Master HeNB 310, and a GTP tunnel between the HeNB-GW 314 and the Secondary HeNB 312, as illustrated in FIG. 3 with pipe-like (i.e. thick) two-way arrows labeled as "GTP" between each pair of these peer nodes. On the other hand, thin two-way arrows shown in FIG. 3 between the MME 316 and the HeNB-GW 314, between the HeNB-GW 314 and the Master HeNB 310, and between the HeNB-GW 314 and the Secondary HeNB 312 represent exchange of control/signaling information between these network elements.

Since, as previously described herein, the GTP tunnel is provided on a per-bearer basis, the GTP tunnels shown in FIG. 3 are for a particular bearer. Furthermore, a particular bearer would typically have only one of the tunnels shown in FIG. 3 between the HeNB-GW 314 and the E-UTRAN 306—either to the Master HeNB 310 or to the Secondary HeNB 312. Similar separate tunnels could be present for other bearers. For example, for a first bearer served by the Master HeNB 310, a first GTP tunnel would be between the P-GW 322 (or the O.N. 324) and the S-GW 320, with the TEID of the first tunnel identifying the P-GW 322 (or the O.N. 324) and the S-GW 320 as the tunnel endpoints, a second GTP tunnel would be between the S-GW 320 and the HeNB-GW 314, with the TEID of the second tunnel identifying the S-GW 320 and the HeNB-GW 314 as the tunnel endpoints, and a third GTP tunnel between the HeNB-GW 314 and the Master HeNB 310, with the TEID of the third tunnel identifying the HeNB-GW 314 and the Master HeNB 310 as the tunnel endpoints. On the other hand, for a second bearer served by the Secondary HeNB 312, the first and the second GTP tunnels would be as for the first bearer, but separate from those of the first bearer, while the third GTP tunnel would be between the HeNB-GW 314 and the Secondary HeNB 312, with the TEID of the third tunnel identifying the HeNB-GW 314 and the Secondary HeNB 312 as the tunnel endpoints.

Figure 4:
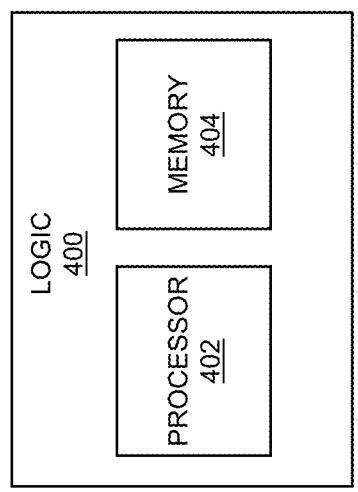
FIG. 4 illustrates a logical entity 400 for assisting core signaling reduction in dual connectivity, according to some embodiments of the present disclosure.

FIG. 4 illustrates a logical entity 400 for assisting core signaling reduction in dual connectivity, according to some embodiments of the present disclosure. In various embodiments, the CSR logic 328 may be implemented as the logical entity 400. FIG. 4 may be considered to illustrate exemplary internal structure associated with the logic 328, as well as with any other elements shown in FIG. 3.

As shown in FIG. 4, the logic 400 may include at least one processor 402 and at least one memory element 404, along with any other suitable hardware and/or software to enable its intended functionality of assisting load-balancing in a distributed gateway as described herein. Similarly, each of the HeNBs 310 and 312, the UE 308, the HeNB-GW 314, the MME 316, the HSS 318, the S-GW 320, and the P-GW 322 may include memory elements for storing information to be used for assisting core signaling reduction in dual connectivity operations as outlined herein, and a processor that can execute software or an algorithm to perform activities related to the core signaling reduction in dual connectivity as discussed in this Specification. Any of these devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to the logic 328, the HeNBs 310 and 312, the UE 308, the HeNB-GW 314, the MME 316, the HSS 318, the S-GW 320, and the P-GW 322 could be provided in any database, register, control list, cache, or storage structure, all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and UE (e.g., mobile nodes) can also include suitable interfaces for receiving, transmitting, and/or otherwise communicating data or information in a network environment.

Note that in certain example implementations, the improved E-RAB modification mechanisms as outlined herein may be implemented by logic encoded in one or more tangible media, which may be inclusive of non-transitory media, e.g., embedded logic provided in an ASIC, in DSP instructions, software [potentially inclusive of object code and source code] to be executed by a processor, or other similar machine, etc. In some of these instances, memory elements, such as e.g. memory 404 shown in FIG. 4, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. processor 402 shown in FIG. 4, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 5:
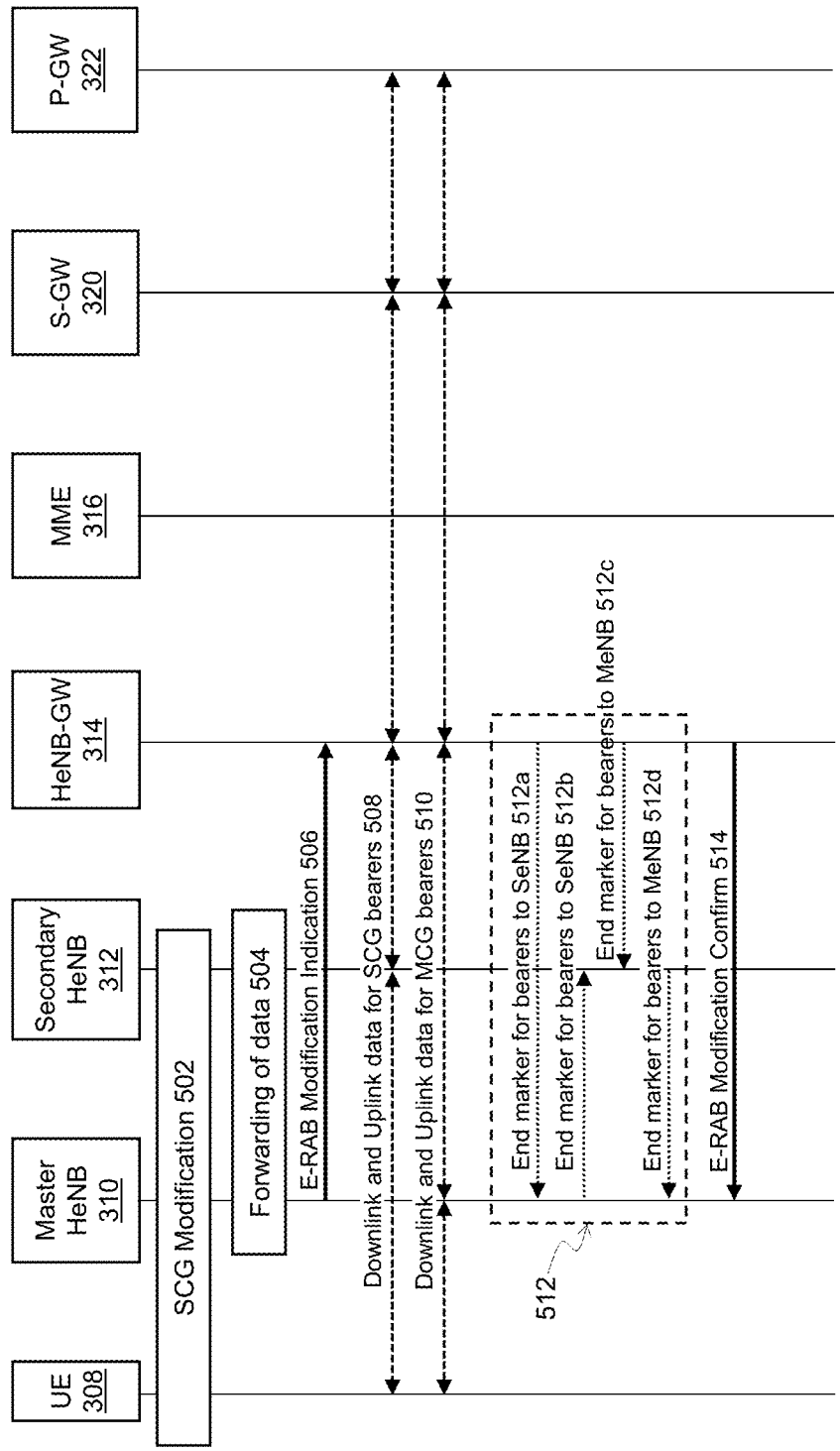
FIG. 5 illustrates an E-RAB modification procedure configured to provide core signaling reduction in dual connectivity, according to some embodiments of the present disclosure.

FIG. 5 illustrates an improved E-RAB modification procedure configured to provide core signaling reduction in dual connectivity, according to some embodiments of the present disclosure. For simplicity, actions illustrated in FIG. 5 are described to be performed, by the respective network elements (e.g. the Master HeNB 310, the Secondary HeNB 312, and the HeNB-GW 314), even though it is the respective logic such as the logic 400 or 328 within or associated with those elements that are configured to perform the actions.

Similar to the approach shown in FIG. 2, the improved E-RAB modification procedure may be preceded by, or may be considered to begin with, a step shown in FIG. 5 as SCG modification 502, which is analogous to the SCG modification step 202 described above for FIG. 2.

After that, a step shown in FIG. 5 as Forwarding of data 504 takes place between the Master HeNB 310 and the Secondary HeNB 312, which is also analogous to the corresponding step 204 described above for FIG. 2.

In step 506 the Master HeNB 310 sends an E-RAB Modification Indication message, but instead of sending this message to the MME as it was done in the approach of FIG. 2, the message is now sent to the HeNB-GW 314. Content and structure of an E-RAB Modification Indication message of step 506 may be the same as that sent in step 206 of FIG. 2 in that the message includes the transport layer addresses (e.g. IP addresses) of the radio access points between which EPS bearers could be switched and TEIDs for DL user plane for all the EPS bearers. The E-RAB Modification Indication message of step 506 may also indicate, for each bearer, whether it is modified or not. For example, if a first bearer is switched from the Master HeNB 310 to the Secondary HeNB 312, then the E-RAB Modification Indication message of step 506 would indicate the first bearer as a bearer that is being modified, and in an entry providing information for the first bearer would include a transport layer address of the Secondary HeNB 312 and a DL TEID at the Secondary HeNB 312 for the first bearer. On the other hand, if e.g. a second bearer is switched from the Secondary HeNB 312 to the Master HeNB 310, then the E-RAB Modification Indication message of step 506 would indicate the second bearer as a bearer that is being modified, and in an entry providing information for the second bearer would include a transport layer address of the Master HeNB 310 and a DL TEID at the Master HeNB 310 for the second bearer. Still further, if e.g. a third bearer is not being switched and remains e.g. with the Master HeNB 310, then the E-RAB Modification Indication message of step 506 would indicate the third bearer as a bearer that is not being modified, and in an entry providing information for the third bearer would include a transport layer address of the Master HeNB 310 and a DL TEID at the Master HeNB 310 for the third bearer. In some embodiments, a single E-RAB Modification Indication Message of step 506 could include any and all of these different entries, e.g. for all bearers. In other embodiments, different E-RAB Modification Indication Messages could be sent, e.g. one per bearer. Any manner of providing the transport layer addresses of HeNBs and TEIDs for DL of user plane data, as described herein, for different bearers, from the Master HeNB 310 to the HeNB-GW 314 is within the scope of the present disclosure.

Upon receipt of the E-RAB Modification Indication message of step 506, the HeNB-GW 314 designates the transport layer addresses and downlink TEIDs included in the E-RAB Modification Indication message for bearers that are to be modified as the new transport layer addresses and TEIDs for sending DL user plane data to subscriber sessions that utilize the bearers being switched. The HeNB-GW 314 also releases any old user plane and/or transport network layer (TNL) resources for the bearers that are being switched. The release of the resources is in the context of the bearer switch which has happened from/to SeNB and typically includes the Tunnel Identification and transport layer address for sending the User Data in the Downlink direction towards MeNB or SeNB.

Upon receipt of the E-RAB Modification Indication message of step 506, the HeNB-GW 314 also creates and stored any kind of mapping associating the old TEID of the GTP tunnel in the radio access network part with the new TEID for bearers that are being switched. The HeNB-GW 314 will later use this information, as described in greater detail below, to replace, in the DL packets arriving at the HeNB-GW 314 from the core network 304, TEIDs indicated by the core network with TEIDs indicated by the Master HeNB 310 that reflect switches between the Master HeNB 310 and the Secondary HeNB 312. Thus, the switching remains hidden from the CN 304. Continuing with the examples of the first, second and third bearers described above, where the first and second bearers were switched (in the opposite direction from one another) and the third bearer was not switched, the HeNB-GW 314 would create a mapping indicating that, for the first bearer, the old TEID was indicating the Master HeNB 310 as a tunnel end point of a GTP tunnel with the HeNB-GW 314, but that now (i.e. as a result of the switch), a new TEID indicating the Secondary HeNB 312 as a tunnel end point of a GTP tunnel with the HeNB-GW 314 should be used. In that mapping for the first bearer the HeNB-GW 314 may also add the transport layer address for the Secondary HeNB 312 as received in the message step 506. On the other hand, for the second bearer, the HeNB-GW 314 would create a mapping indicating that the old TEID was indicating the Secondary HeNB 312 as a tunnel end point of a GTP tunnel with the HeNB-GW 314, but that now (i.e. as a result of the switch), a new TEID indicating the Master HeNB 310 as a tunnel end point of a GTP tunnel with the HeNB-GW 314 should be used. In that mapping for the second bearer the HeNB-GW 314 may also add the transport layer address for the Master HeNB 310 as received in the message step 506.

For bearers that are indicated in the message of step 506 as not being modified, the HeNB-GW 314 retains the existing bearer information for sending DL user data. Thus, for the third bearer, since nothing changed on the radio access side, no entry needs to be created. Alternatively, the HeNB-GW 314 could create an entry for the third bearer as well, but indicate that the "old" and "new" TEIDs of the tunnel end point of a GTP tunnel with the HeNB-GW 314 are the same. Any kind of mapping, repository, database, etc. that would allow the HeNB-GW 314 to identify to which TEID and which transport address the DL data packets are to be sent to reach the correct eNB are within the scope of the present disclosure.

After the HeNB-GW 314 has been updated with new DL information for the bearers, the HeNB-GW 314 can start sending downlink packets to the correct eNBs using the new transport layer addresses and the TEIDs. Since with this approach the core network 304 is not aware of the switches between Master HeNB 310 and Secondary HeNB 312 that may have taken place for some bearers, the downlinks packets arriving at the HeNB-GW 314 from the core network 304 (i.e. from the S-GW 320) will have the old TEIDs of the bearers at the different radio access points. But since the HeNB-GW 314 is aware of the switch, the HeNB-GW 314 will replace the TEIDs of those bearers that have switched to the new TEIDs reflecting the switch (the TEIDs received in step 506) and will use the new transport layer addresses (also received in step 506) to forward those data packets to the correct eNB. Continuing with the examples of the first, second and third bearers described above, where the first and second bearers were switched (in the opposite direction from one another) and the third bearer was not switched, when the HeNB-GW 314 would receive from the S-GW 320 a DL user data packet for the first bearer indicating the TEID of the Master HeNB 310 as a tunnel end point of a GTP tunnel from the HeNB-GW 314, the HeNB-GW 314 would replace the TEID of the Master HeNB 310 with the TEID received in the message of step 506, namely with the TEID of the Secondary HeNB 312 for the first bearer and use this TEID, along with the transport layer address of the Secondary HeNB 312 to forward the DL data to the Secondary HeNB 312. Similarly, when the HeNB-GW 314 would receive from the S-GW 320 a DL user data packet for the second bearer indicating the TEID of the Secondary HeNB 312 as a tunnel end point of a GTP tunnel from the HeNB-GW 314, the HeNB-GW 314 would replace the TEID of the Secondary HeNB 312 with the TEID received in the message of step 506, namely with the TEID of the Master HeNB 310 for the second bearer and use this TEID, along with the transport layer address of the Master HeNB 310 to forward the DL data to the Master HeNB 310. For the third bearer, the HeNB-GW 314 would know that no switch was made and would use the same TEID for the radio access part GTP tunnel as indicated in the received DL packet.

In FIG. 5, dashed double-arrows 508 between the UE 308, the Secondary HeNB 312, the HeNB-GW 314, the S-GW 320, and the P-GW 322 indicate downlink and uplink exchanges of data between the respective elements connected by the arrows, in case of SCG bearers. Similar to the arrows 508, dashed double-arrows 510 shown in FIG. 5 indicate downlink and uplink exchanges of data between the respective elements connected by the arrows, but for the case of MCG bearers.

In step 512, in order to assist the reordering function in the Master HeNB 310 and/or the Secondary HeNB 312, for the bearers that are switched between the Master HeNB 310 and the Secondary HeNB 312, the HeNB-GW 314 sends one or more "end marker" packets on the old path immediately after switching the path. To this end, step 512 includes step 512a during which the HeNB-GW 314 sends to the Master HeNB 310 an end marker packet indicating bearers that were transferred from the Master HeNB 310 to the Secondary HeNB 312, step 512b during which the Master HeNB 310 forwards the indication of step 512a to the Secondary HeNB 312, step 512c during which the HeNB-GW 314 sends to the Secondary HeNB 312 an end marker packet indicating bearers that were transferred from the Secondary HeNB 312 to the Master HeNB 310, and step 512d during which the Secondary HeNB 312 forwards the indication of step 512c to the Master HeNB 310.

In step 514, the HeNB-GW 314 confirms the E-RAB modification with the E-RAB Modification Confirm message provided to the Master HeNB 310. In this message, the HeNB-GW 314 indicates for each bearer whether it was successfully modified, kept unmodified or already released by the EPC. If a bearer failed to be modified, the HeNB-GW 314 provides that information in the confirmation step 514 as well, for all bearers that failed to be modified.

Figure 6:
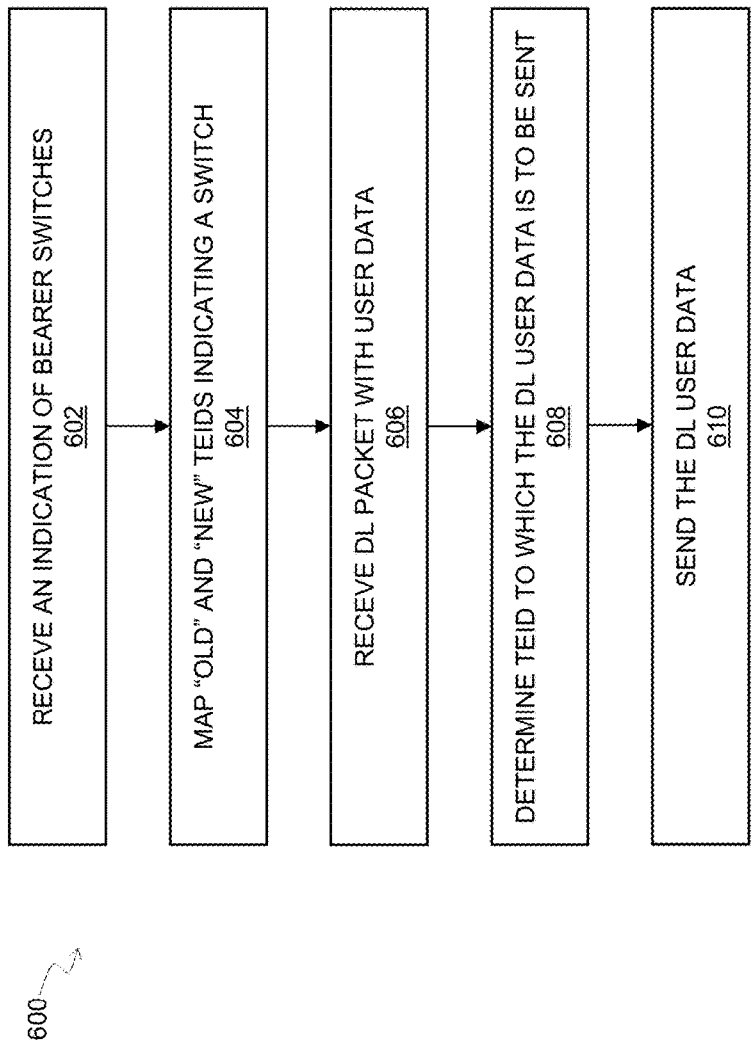
FIG. 6 is a simplified flow diagram illustrating example operations associated with providing core signaling reduction in dual connectivity in a network environment in various potential embodiments of the present disclosure.

FIG. 6 is a simplified flow diagram 600 illustrating example operations associated with providing core signaling reduction in dual connectivity in a network environment in various potential embodiments of the present disclosure. Although the diagram 600 is described with reference to elements shown in FIG. 3, any communication system configured to perform these steps is within the scope of the present disclosure. Furthermore, while the steps are described with reference to the Master and Secondary radio access points being HeNBs, descriptions provided herein are applicable to any Master and Secondary radio access points—e.g. the Secondary HeNB 312 could be replaced with a Secondary WLAN access point or any other Secondary radio access point.

The method 600 may begin with step 602, where the HeNB-GW 314 receives from the Master HeNB 310 a message indicating that one of more of the radio bearers are to be switched. Such a message could be e.g. the E-RAB Modification Indication message as described in step 506 above.

The method then proceeds to step 604, where the HeNB-GW 314 creates a mapping reflecting new TEIDs for the radio bearers that are to be switched and indicating the transport layer addresses of the new HeNBs to which the radio bearers were switched to.

In step 606, the HeNB-GW 314 receives, from the S-GW 320, a downlink user data packet identifying a certain TEID for a certain radio bearer.

In step 608, the HeNB-GW 314 determines whether the TEID identified for the bearer of the downlink user data packet received in step 606 is the correct TEID. To that end, the HeNB-GW 314 uses the mapping of step 604 to identify whether there is a new TEID associated with the TEID for that bearer as indicated for the user data of the packet of step 606. If so, then in step 610 the HeNB-GW 314 sends the user data of the packet of step 606 to the new TEID obtained from the mapping, using the transport layer addresses of the new radio access point to which the radio bearer of that TEID was switched to. Otherwise, in step 610 the HeNB-GW 314 sends the user data of the packet of step 606 to the old TEID, using the old transport layer address of the old radio access point (i.e. the bearer was not switched).

It is important to note that the steps in the appended diagrams illustrate only some of the possible signaling scenarios and patterns that may be executed by, or within, the communication system 300. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding example operations and use cases have been offered for purposes of example and discussion. Substantial flexibility is provided by the communication system 300 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

Selected Examples

Example 1 provides a computer-implemented method to be performed at a first network device configured to operate as a small cell gateway anchoring both control and user Plane (which is different from e.g. a S-GW which anchors only user plane) for a Master Radio Access Point (MRAP) and a Secondary Radio Access Point (SRAP). The method includes receiving, from the MRAP, a first message including an indication that a first bearer is to be switched from the MRAP to the SRAP, the first message including a Tunnel Endpoint Identifier TEID of a general packet radio service (GPRS) tunneling communications protocol (GTP) tunnel of a long-term evolution (LTE) network for the first bearer in the SRAP identifying a GTP tunnel endpoint for the first bearer within (or associated with) the SRAP, and a first transport layer address (e.g. IP address) of the SRAP to which downlink data for the TEID for the first bearer in the SRAP is to be sent to reach user devices that utilize the first bearer. The method further includes receiving first downlink user plane data for a subscriber session identified by a TEID for the first bearer in the MRAP; replacing, for the first downlink data, the TEID for the first bearer in the MRAP with the TEID for the first bearer in the SRAP; and sending the first downlink data to the first transport layer address using the TEID for the first bearer in the SRAP (i.e. sending the received downlink data for all subscriber sessions that utilize the first bearer to the SRAP, using the transport layer address of the new RAP, the SRAP, that corresponds to the first bearer).

Example 2 provides the method according to Example 1, further including ensuring that radio resources for the first bearer allocated on the MRAP are released and that radio resources for the first bearer are allocated on the SRAP. Such radio resources typically include user-plane resources and transport network layer (TNL) resources.

Example 3 provides the method according to Examples 1 or 2, where the first message includes a first Evolved Radio Access Bearer (E-RAB) Modification Indication message.

Example 4 provides the method according to any one of the preceding Examples, further including sending a first reordering message to the SRAP (i.e. to the RAP to which the bearer was switched to) to trigger reordering function of user data in the SRAP.

Example 5 provides the method according to Example 4, where the first reordering message includes a first GTPu End Marker message.

Example 6 provides the method according to any one of the preceding Examples, further including sending a first confirmation message to the MRAP to confirm that the first bearer has been requested to be switched from the MRAP to the SRAP.

Example 7 provides the method according to Example 6, where the first confirmation message includes a E-RAB Modification Confirm message.

Example 8 provides the method according to any one of the preceding Examples, further including receiving, from the MRAP, a second message including an indication that a second bearer is to be switched from the SRAP to the MRAP, the second message including a TEID for the second bearer in the MRAP identifying a GTP tunnel endpoint for the second bearer within (or associated with) the MRAP and a second transport layer address (e.g. IP address) of the MRAP to which downlink data for the TEID associated with the second bearer is to be sent to reach the user devices that utilize the second bearer; receiving second downlink user plane data for a subscriber session identified by a TEID for the second bearer in the SRAP; replacing, for the second downlink data, the TEID for the second bearer in the SRAP with the TEID for the second bearer in the MRAP; and sending the second downlink data to the second transport layer address using the TEID for the second bearer in the MRAP (i.e. sending the received downlink data for all subscriber sessions that utilize the second bearer to the MRAP, using the transport layer address that corresponds to the second bearer).

Example 9 provides the method according to any one of the preceding Examples, where the MRAP is a Master evolved Node B (MeNB).

In some embodiments, the MeNB could be an eNB for a macro cell. In other embodiments, the MeNB could be an eNB for a small cell, i.e. the MeNB is a MHeNB.

Example 10 provides the method according to any one of Examples 1-9, where the SRAP is a Secondary evolved Node B (SeNB).

In some embodiments, the SeNB could be an eNB for a macro cell. In other embodiments, the SeNB could be an eNB for a small cell, i.e. the SeNB is a SHeNB.

Example 11 provides the method according to any one of Examples 1-9, where the SRAP is a radio access point for a wireless local area network (WLAN), such as e.g. WiFi.

Example 12 provides a system including a first network device configured to operate as a small cell gateway for a MRAP and a SRAP, the first network device including at least one memory configured to store computer executable instructions, and at least one processor coupled to the at least one memory and configured, when executing the instructions, to perform a method according to any one of the preceding Examples.

Example 13 provides one or more computer readable storage media encoded with software including computer executable instructions and, when the software is executed, operable to configure a first network device to operate as a small cell gateway for a MRAP and a SRAP by configuring the first network device to perform a method according to any one of the preceding Examples.

Example 14 provides a computer program product comprising computer-readable software code for configuring a first network device configured to operate as a small cell gateway for a MRAP and a SRAP to perform a method according to any one of the preceding Examples.

What is claimed is:
1. A method comprising:
at a first network device configured to operate as a small cell gateway for a Master Radio Access Point (MRAP) and a Secondary Radio Access Point (SRAP), wherein the first network device presents the MRAP and the SRAP as a single access point to a perspective of a plurality of core network functions that use the first network device to access the MRAP and SRAP:
receiving, from the MRAP, a first message comprising an indication that a first bearer is to be switched from the MRAP to the SRAP, the first message comprising:
a Tunnel Endpoint Identifier TEID for the first bearer in the SRAP identifying a GTP tunnel endpoint for the first bearer within the SRAP, and
a first transport layer address of the SRAP to which downlink data for the TEID for the first bearer in the SRAP is to be sent;
receiving first downlink user plane data for a subscriber session identified by a TEID for the first bearer in the MRAP;
replacing, for the first downlink data, the TEID for the first bearer in the MRAP with the TEID for the first bearer in the SRAP; and
sending the first downlink data to the first transport layer address using the TEID for the first bearer in the SRAP.

2. The method according to claim 1, further comprising ensuring that radio resources for the first bearer allocated on the MRAP are released and that radio resources for the first bearer are allocated on the SRAP.

3. The method according to claim 1, wherein the first message comprises a first Evolved Radio Access Bearer (E-RAB) Modification Indication message.

4. The method according to claim 1, further comprising sending a first reordering message to the SRAP to trigger reordering function of user data in the SRAP.

5. The method according to claim 4, wherein the first reordering message comprises a first GTPu End Marker message.

6. The method according to claim 1, further comprising sending a first confirmation message to the MRAP to confirm that the first bearer has been requested to be switched from the MRAP to the SRAP.

7. The method according to claim 6, wherein the first confirmation message comprises a ERAB Modification Confirm message.

8. The method according to claim 1, further comprising:
receiving, from the MRAP, a second message comprising an indication that a second bearer is to be switched from the SRAP to the MRAP, the second message comprising:
a TEID for the second bearer in the MRAP identifying a GTP tunnel endpoint for the second bearer within the MRAP, and
a second transport layer address of the MRAP to which downlink data for the TEID associated with the second bearer is to be sent;
receiving second downlink user plane data for a subscriber session identified by a TEID for the second bearer in the SRAP;
replacing, for the second downlink data, the TEID for the second bearer in the SRAP with the TEID for the second bearer in the MRAP; and
sending the second downlink data to the second transport layer address using the TEID for the second bearer in the MRAP.

9. The method according to claim 1, wherein the MRAP is a Master evolved Node B (MeNB).

10. The method according to claim 1, wherein the SRAP is a Secondary evolved Node B (Se NB).

11. The method according to claim 1, wherein the SRAP is a radio access point for a wireless local area network (WLAN).

12. A system comprising:
a first network device configured to operate as a small cell gateway for a Master Radio Access Point (MRAP) and a Secondary Radio Access Point (SRAP), wherein the first network device presents the MRAP and the SRAP as a single access point to a perspective of a plurality of core network functions that use the first network device to access the MRAP and SRAP,
the first network device comprising:
at least one memory configured to store computer executable instructions, and
at least one processor coupled to the at least one memory and configured, when executing the instructions, to:
receive, from the MRAP, a first message comprising an indication that a first bearer is to be switched from the MRAP to the SRAP, the first message comprising:
a Tunnel Endpoint Identifier TEID for the first bearer in the SRAP identifying a GTP tunnel endpoint for the first bearer within the SRAP, and
a first transport layer address of the SRAP to which downlink data for the TEID for the first bearer in the SRAP is to be sent;
receive first downlink user plane data for a subscriber session identified by a TEID for the first bearer in the MRAP;
replace, for the first downlink data, the TE ID for the first bearer in the MRAP with the TEID for the first bearer in the SRAP; and
send the first downlink data to the first transport layer address using the TEID for the first bearer in the SRAP.

13. The system according to claim 12, wherein each of the MRAP and the SRAP is a small cell radio access point and the first network device is a small cell radio access point gateway (HeNB-GW) for small cell radio access points.

14. The system according to claim 12, wherein the at least one processor is further configured to ensure that radio resources for the first bearer allocated on the MRAP are released and that radio resources for the first bearer are allocated on the SRAP.

15. The system according to claim 12, wherein the first message comprises a first Evolved Radio Access Bearer (E-RAB) Modification Indication message.

16. The system according to claim 12, wherein the at least one processor is further configured to send a first confirmation message to the MRAP to confirm that the first bearer has been requested to be switched from the MRAP to the SRAP.

17. The system according to claim 16, wherein the first confirmation message comprises a E-RAB Modification Confirm message.

18. The system according to claim 12, wherein the at least one processor is further configured to:
receive, from the MRAP, a second message comprising an indication that a second bearer is to be switched from the SRAP to the MRAP, the second message comprising:
a TEID for the second bearer in the MRAP identifying a GTP tunnel endpoint for the second bearer within the MRAP, and
a second transport layer address of the MRAP to which downlink data for the TEID associated with the second bearer is to be sent;

receive second downlink user plane data for a subscriber session identified by a TEID for the second bearer in the SRAP;

replace, for the second downlink data, the TE ID for the second bearer in the SRAP with the TEID for the second bearer in the MRAP; and send the second downlink data to the second transport layer address using the TEID for the second bearer in the MRAP.

19. A non-transitory computer readable storage medium for a first network device configured to operate as a small cell gateway for a Master Radio Access Point (MRAP) and a Secondary Radio Access Point (SRAP), wherein the first network device presents the MRAP and the SRAP as a single access point to a perspective of a plurality of core network functions that use the first network device to access the MRAP and SRAP, the computer-readable storage medium having computer-readable program code embodied therewith, the computer-readable program code executable by one or more computer processors to perform an operation that includes:

receiving, from the MRAP, a first message comprising an indication that a first bearer is to be switched from the MRAP to the SRAP, the first message comprising:

a Tunnel Endpoint Identifier TEID for the first bearer in the SRAP identifying a GTP tunnel endpoint for the first bearer within the SRAP, and a first transport layer address of the SRAP to which downlink data for the TEID for the first bearer in the SRAP is to be sent;

receiving first downlink user plane data for a subscriber session identified by a TEID for the first bearer in the MRAP;

replacing, for the first downlink data, the TEID for the first bearer in the MRAP with the TEID for the first bearer in the SRAP; and sending the first downlink data to the first transport layer address using the TEID for the first bearer in the SRAP.

20. The computer readable storage medium according to claim 19, wherein the operation further comprises:

receiving, from the MRAP, a second message comprising an indication that a second bearer is to be switched from the SRAP to the MRAP, the second message comprising:

a TEID for the second bearer in the MRAP identifying a GTP tunnel endpoint for the second bearer within the MRAP, and a second transport layer address of the MRAP to which downlink data for the TEID associated with the second bearer is to be sent;

receiving second downlink user plane data for a subscriber session identified by a TEID for the second bearer in the SRAP;

replacing, for the second downlink data, the TEID for the second bearer in the SRAP with the TEID for the second bearer in the MRAP; and sending the second downlink data to the second transport layer address using the TEID for the second bearer in the MRAP.

* * * * *

UNITED STATES PATENT AND TRADEMARK OFFICE
CERTIFICATE OF CORRECTION

PATENT NO. : 10,194,480 B2
APPLICATION NO. : 15/065686
DATED : January 29, 2019
INVENTOR(S) : Indermeet Singh Gandhi Page 1 of 1

It is certified that error appears in the above-identified patent and that said Letters Patent is hereby corrected as shown below:

In the Claims

In Column 22, Line 31, in Claim 12, delete "TE ID" and insert -- TEID --, therefor.

In Column 23, Line 4, in Claim 18, delete "TE ID" and insert -- TEID --, therefor.

Signed and Sealed this
Sixteenth Day of April, 2019

Andrei Iancu
*Director of the United States Patent and Trademark Office*